US010778785B2

(12) United States Patent
Shi et al.

(10) Patent No.: US 10,778,785 B2
(45) Date of Patent: Sep. 15, 2020

(54) COGNITIVE METHOD FOR DETECTING SERVICE AVAILABILITY IN A CLOUD ENVIRONMENT

(71) Applicant: International Business Machines Corporation, Armonk, NY (US)

(72) Inventors: Hui Qing Shi, Beijing (CN); Wei Wang, Beijing (CN); Yi Bin Wang, Beijing (CN); Yuan Yuan, Beijing (CN); Ya Pei Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 15/823,986

(22) Filed: Nov. 28, 2017

(65) Prior Publication Data

US 2019/0166208 A1 May 30, 2019

(51) Int. Cl.
*H04L 29/08* (2006.01)
*G06F 9/455* (2018.01)
*G06F 16/2457* (2019.01)

(52) U.S. Cl.
CPC .......... *H04L 67/16* (2013.01); *G06F 9/45558* (2013.01); *G06F 16/24578* (2019.01); *H04L 67/22* (2013.01); *H04L 67/322* (2013.01)

(58) Field of Classification Search
CPC ....... H04L 67/16; H04L 67/322; H04L 67/22; G06F 16/24578; G06F 9/45558
See application file for complete search history.

(56) References Cited

U.S. PATENT DOCUMENTS

| 8,245,140 | B2* | 8/2012 | Barber | G06F 9/5077 |
| | | | | 345/440 |
| 8,296,609 | B2 | 10/2012 | Nordstrom | |
| 9,208,051 | B2* | 12/2015 | Poston | H04L 41/0604 |
| 9,298,485 | B2* | 3/2016 | Bragstad | H04L 41/5019 |
| 9,338,223 | B2* | 5/2016 | Threefoot | H04L 67/10 |
| 9,379,950 | B2* | 6/2016 | Bragstad | H04L 43/04 |
| 9,396,158 | B2* | 7/2016 | Cradick | G06F 15/173 |
| 9,397,905 | B1 | 7/2016 | Moniz et al. | |
| 9,461,933 | B2* | 10/2016 | Takemura | H04L 47/70 |
| 9,525,599 | B1* | 12/2016 | Wang | C23C 18/1641 |
| 9,553,785 | B2* | 1/2017 | Bragstad | H04L 67/2814 |
| 9,928,100 | B2* | 3/2018 | Dow | G06F 9/45558 |
| 10,127,337 | B1* | 11/2018 | Wang | C23C 18/1641 |
| 10,229,243 | B2* | 3/2019 | Poston | G06F 11/3006 |
| 10,530,632 | B1* | 1/2020 | Mukhopadhyaya | |
| | | | | H04L 29/08135 |
| 10,592,825 | B2* | 3/2020 | Garg | G06Q 10/00 |

(Continued)

FOREIGN PATENT DOCUMENTS

| CN | 102799947 A | 11/2012 |
| CN | 105933138 A | 9/2016 |

(Continued)

*Primary Examiner* — Kostas J Katsikis
(74) *Attorney, Agent, or Firm* — Brown & Michaels, PC; Christopher Pignato

(57) ABSTRACT

Cognitively detecting cloud services and their associated status of a Virtual Machine and/or Container in a cloud platform to predict availability of cloud services preferably including the status of the services, a service object health map, and a service health status. The outputs are preferably sent to a user for feedback, which is sent back to the cognitive service.

14 Claims, 7 Drawing Sheets

(56) References Cited

U.S. PATENT DOCUMENTS

| | | | |
|---|---|---|---|
| 2006/0069761 A1* | 3/2006 | Singh | H04L 67/1012 709/222 |
| 2009/0300173 A1* | 12/2009 | Bakman | H04L 41/147 709/224 |
| 2010/0250734 A1* | 9/2010 | Ajiro | G06F 9/5083 709/224 |
| 2010/0274890 A1* | 10/2010 | Patel | H04L 43/08 709/224 |
| 2011/0022812 A1* | 1/2011 | van der Linden | H04L 67/1097 711/163 |
| 2011/0126207 A1* | 5/2011 | Wipfel | H04L 9/3213 718/104 |
| 2011/0161851 A1* | 6/2011 | Barber | G06F 9/4856 715/769 |
| 2013/0326529 A1* | 12/2013 | Augenstein | G06F 9/50 718/103 |
| 2014/0180661 A1* | 6/2014 | Poston | G06F 11/3006 703/13 |
| 2014/0279201 A1* | 9/2014 | Iyoob | G06Q 30/0631 705/26.7 |
| 2015/0052247 A1* | 2/2015 | Threefoot | H04L 67/10 709/225 |
| 2015/0205602 A1* | 7/2015 | Prismon | G06F 8/71 717/121 |
| 2015/0341240 A1* | 11/2015 | Iyoob | H04L 43/08 709/201 |
| 2015/0355922 A1* | 12/2015 | Cropper | G06F 9/5044 718/1 |
| 2015/0355929 A1* | 12/2015 | Cropper | G06F 9/5072 718/1 |
| 2016/0048408 A1* | 2/2016 | Madhu | G06F 11/2097 718/1 |
| 2016/0065417 A1* | 3/2016 | Sapuram | G06Q 30/0631 709/223 |
| 2016/0092623 A1* | 3/2016 | Poston | G06F 11/328 703/13 |
| 2017/0075709 A1 | 3/2017 | Feng et al. | |
| 2017/0301028 A1* | 10/2017 | Strabel | G06F 16/285 |
| 2018/0025399 A1* | 1/2018 | Nedeltchev | G06Q 30/0603 705/26.62 |
| 2018/0324059 A1* | 11/2018 | Johal | H04L 43/028 |
| 2019/0068627 A1* | 2/2019 | Thampy | G06N 20/00 |
| 2019/0163851 A1* | 5/2019 | Poston | H04L 41/12 |
| 2019/0166208 A1* | 5/2019 | Shi | H04L 67/16 |

FOREIGN PATENT DOCUMENTS

| | | | |
|---|---|---|---|
| WO | 2015116572 A1 | 8/2015 | |
| WO | WO-2017046635 A1 * | 3/2017 | H04L 67/10 |

* cited by examiner

COGNITIVE METHOD FOR DETECTING SERVICE AVAILABILITY IN A CLOUD ENVIRONMENT

BACKGROUND

The present invention relates to cloud services, and more specifically to cognitively detecting cloud service availability in a cloud environment.

It has become common to provide services through a cloud computing platform, Software as a Service (SaaS), Platform as a Service (PaaS) and Infrastructure as a service (IaaS). It is very important to detect, monitor and maintain the serviceability of related cloud services including Virtual Machines and/or Containers running cloud services. Fundamentally, the service availability of related cloud services depends on the stability, reliability and serviceability of Virtual Machines and/or Containers. Therefore, how to monitor and detect the stability, reliability and serviceability of Virtual Machines and/or Containers is a high priority for Cloud service operation maintenance and management from the view point of end users and cloud providers.

At present, traditional mainstream technologies of monitoring and detecting the status and serviceability of Virtual Machines and/or Containers include IP address and service port ping, network package capture tool, application scanning tool, and/or software agent, etc. The traditional mainstream technologies lack relevance, predictability and intelligence.

SUMMARY

According to one embodiment of the present invention, a method of cognitively detecting the availability of a service in a computing environment is disclosed. The service comprises a plurality of attributes and at least one object including at least item. The method comprising the steps of: obtaining information about the service, the information comprising the attributes and usage of the service; generating a service data model based on the information; calculating a score within the service data model; generating a score card comprising the score, the at least one object and the plurality of attributes; generating a prediction of availability of the service; providing the prediction of availability to a user; receiving feedback from the user; and updating the service data model based on the feedback from the user.

According to another embodiment of the present invention, a computer program product for cognitively detecting the availability of a service in a computing environment is disclosed. The service comprises a plurality of attributes and at least one object including at least item. The computer program product uses a computer comprising at least one processor, one or more memories, one or more computer readable storage media, the computer program product comprising a computer readable storage medium having program instructions embodied therewith. The program instructions executable by the computer to perform a method comprising: obtaining, by the computer, information about the service, the information comprising the attributes and usage of the service; generating, by the computer, a service data model based on the information; calculating, by the computer, a score within the service data model; generating, by the computer, a score card comprising the score, the at least one object and the plurality of attributes; generating, by the computer, a prediction of availability of the service; providing, by the computer, the prediction of availability to a user; receiving, by the computer, feedback from the user; and updating by the computer, the service data model based on the feedback from the user.

According to another embodiment of the present invention, a computer system for cognitively detecting the availability of a service in a computing environment is disclosed. The service comprising a plurality of attributes and at least one object including at least item. The computer system comprising a computer comprising at least one processor, one or more memories, one or more computer readable storage media having program instructions executable by the computer to perform the program instructions comprising: obtaining, by the computer, information about the service, the information comprising the attributes and usage of the service; generating, by the computer, a service data model based on the information; calculating, by the computer, a score within the service data model; generating, by the computer, a score card comprising the score, the at least one object and the plurality of attributes; generating, by the computer, a prediction of availability of the service; providing, by the computer, the prediction of availability to a user; receiving, by the computer, feedback from the user; and updating by the computer, the service data model based on the feedback from the user.

DETAILED DESCRIPTION

Figure 1:
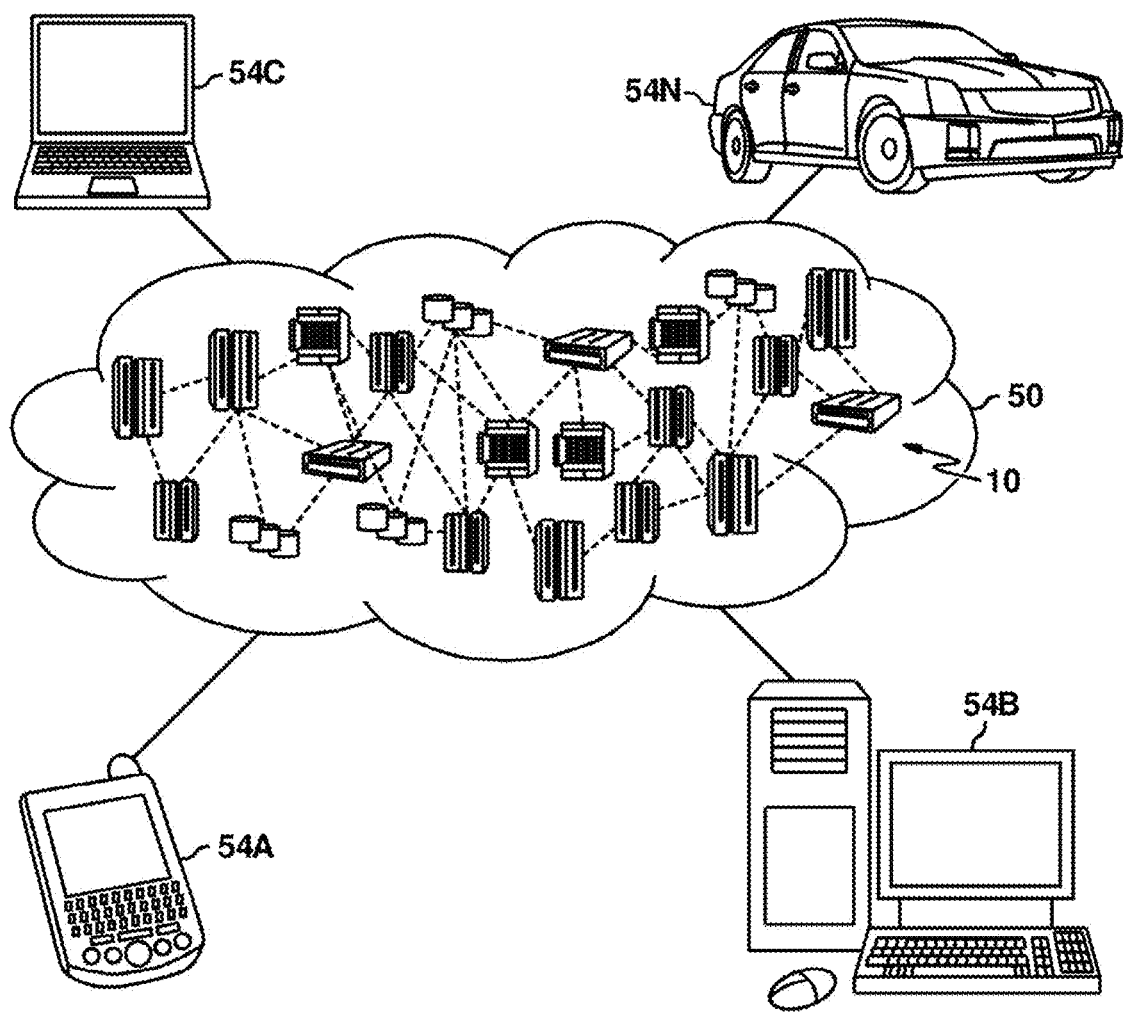
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
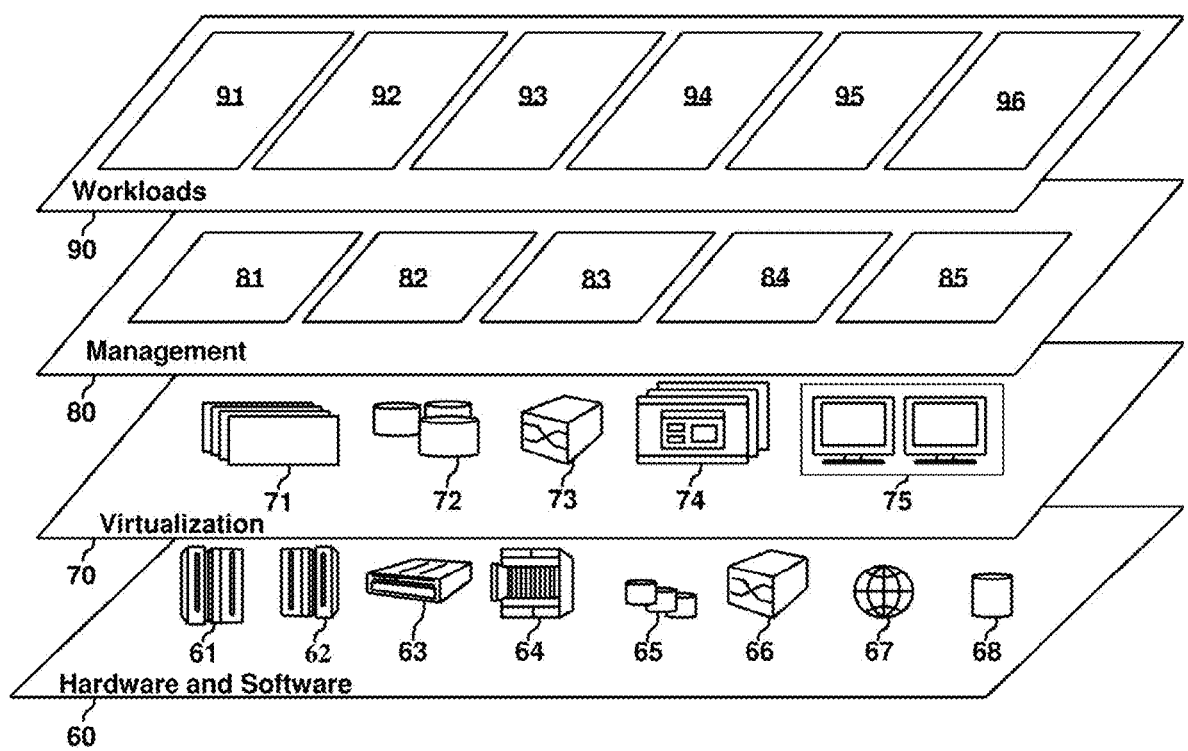
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service availability 96.

Figure 3:
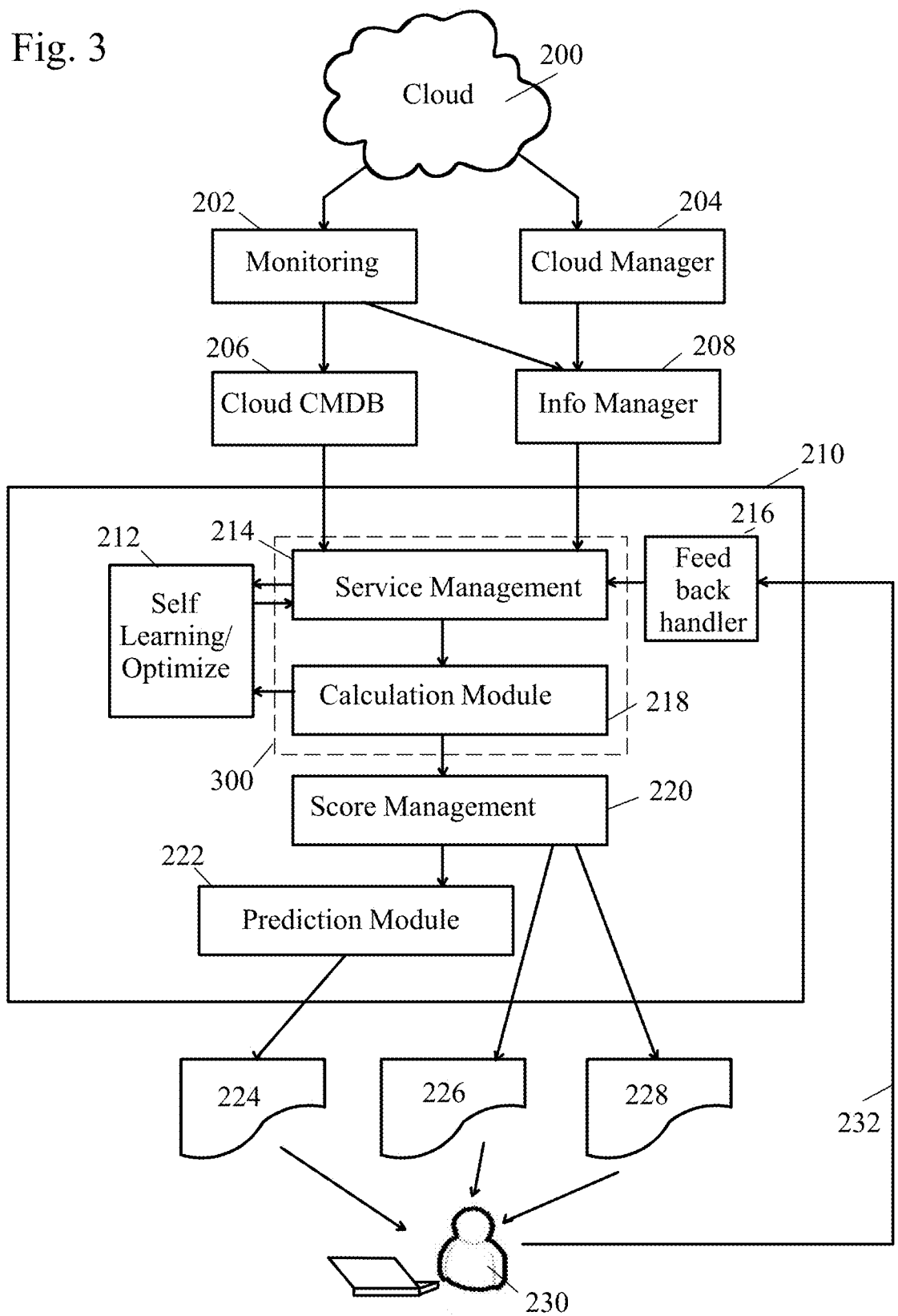
FIG. 3 shows a diagram of a system of cognitively detecting cloud services and their associated status.

FIG. 3 shows a diagram of a system of cognitively detecting cloud services and their associated status of a Virtual Machine and/or Container in a cloud platform.

The cloud 200 is monitored 202 and the information is sent to an information manager 208, and a cloud configuration management database (CMDB) 206. The monitoring includes, but is not limited to servers, facilities, storage, network, hypervisors, virtual machines (VM), containers, topology, software and applications. A cloud manager 204 may manage the information manager 208. The information from the cloud CMDB 206 and the Information manager 208 is sent to a cognitive service 210. The information sent to the cognitive service 210 may include utilization of computer processing unit (CPU), memory and disk space; input output (IO) of a network and/or disk; logs of hardware run time, operating system (OS), database, middleware, cloud management platform, operation and maintenance; events based on predefined conditions; environment parameter configuration information of the OS, database, middleware, and cloud management platform.

The cognitive service 210 outputs a prediction of the availability of cloud services 224 preferably including the status of the services, a service object health map 226, and a service health status 228. The outputs 224, 226, 228 are preferably sent to a user 230, such as an administrator for feedback, which is sent to the cognitive service 210. An example of service health status may be as follows:

TABLE 1

| Service Name | Special Care Object | Score | Health Status |
|---|---|---|---|
| ERP Services | Network, Application | 92 | High Risk |
| Finance Services | Storage, Host | 10 | Healthy |
| ... | ... | ... | ... |

The cognitive service 210 preferably includes a service management module 214, a calculation module 218, score management module 220, prediction module 222, a feedback handler 216 and a self-learning/optimization module 212.

The service management module 214 generates a service data model based on the collected information from cloud 200. The service data model preferably includes a service record for each cloud service within the cloud. The collected information can include a topology of the cloud and associated services, input information and data structure. The service management module 214 receives input from the cloud CMDB 206, the information manager 208, feedback handler 216, and the self-learning/optimization module 212. The service management module 214 outputs data to the calculation module 218.

The calculation module 218 is used to calculate cloud services score based on input from the Service Management module 214. The calculation module 218 outputs data to the self-learning/optimization module 212 and the score management module 220.

The score management module 220 is used to manage the score of every cloud service score based on the input from the calculation module 218. The score management module 220 outputs a service object health map 226, and a service health status 228.

The prediction module 222 is used to predict cloud service availability based on the service score. The prediction module 222 outputs availability of cloud services 224 preferably including the status of the services.

The self-learning and optimization module 212 is used to automatically optimize Service Management 214 by self-learning.

The feedback handler module 216 is used to collect user feedback to refine Service Management 214.

An advantage of the system of the present invention is that the system can work out and infer related services healthy status with cognitive methodology based on the service data model, self-learning and optimization component. Another advantage is predictability: The system of the present invention can predict the healthy status of related cloud services based on collected information of the cloud environment, including fundamental static information and dynamical running information. Additionally, the system of the present invention can infer related cloud services health status by using relationships between service objects. By inferring related services and their associated status, any issues with the services can be detected sooner and therefore the execution of the cloud services can be improved.

Figure 4:
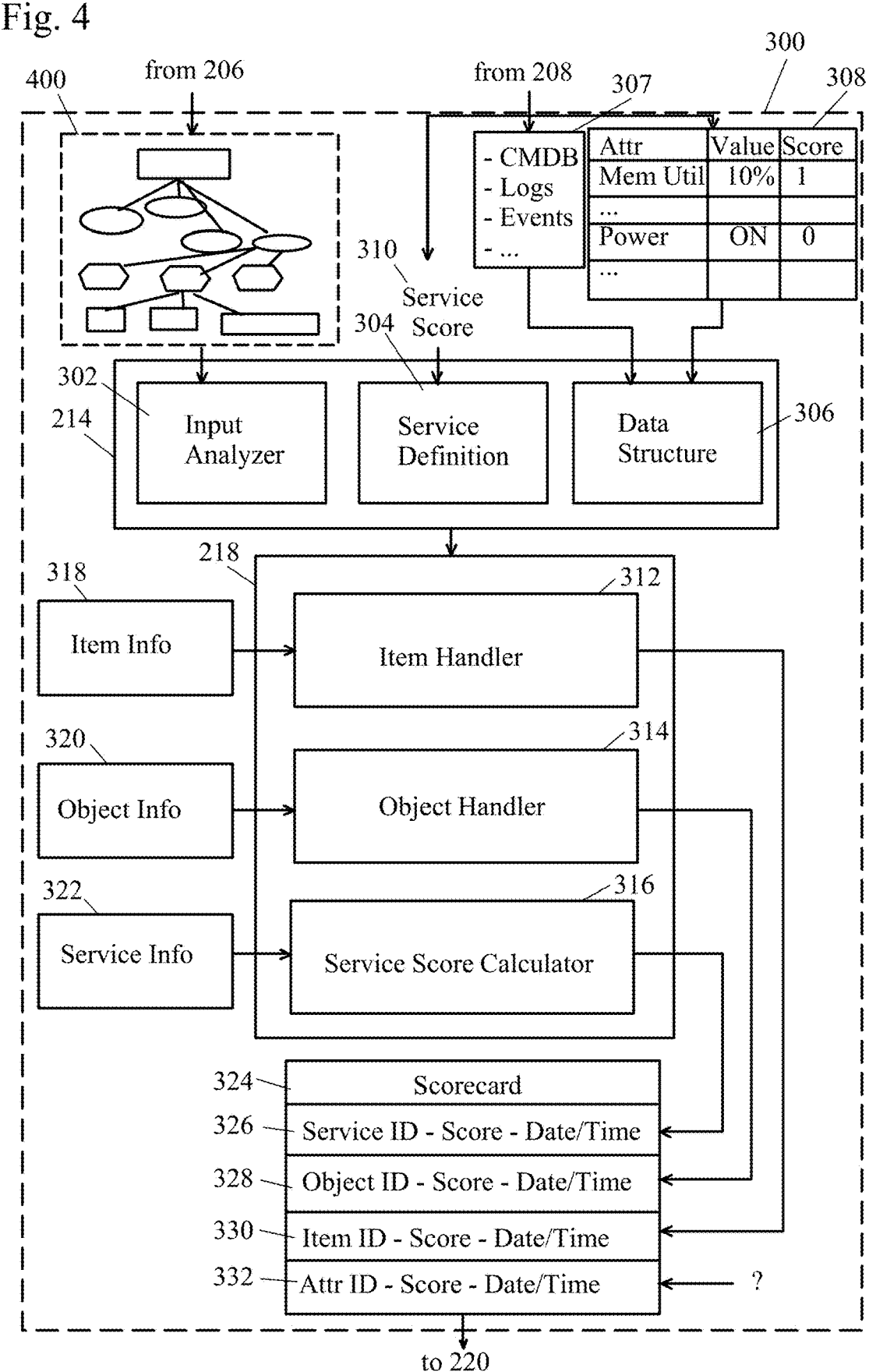
FIG. 4 shows a diagram of the interaction between the service management module, the calculation module and score management module.

FIG. 4 shows a diagram of the interaction between the service management module, the calculation module and score management module.

The service management module 214 includes an input analyzer 302, service definition 304 and data structure 306.

The input analyzer 302 receives and analyzes input 406 from the cloud CMDB 206.

The data structure 306 includes information 308 such as attributes, values and scores regarding the CMDB, logs, events, etc . . . 307 which is received from the information manager 208.

The service definition 304 receives a service score calculation 310 based on the information 308 such as attributes, values and scores 308. The service score may be based on the following fraction calculation formula:

$$\text{Score} = \frac{\sum_{i=0}^{n} s^i w^i}{\sum_{i=0}^{n} w_i}$$

Where:
n=number of leaf nodes (object, item or attribute) for a specific node
s=score of the leaf node
w=weight of the leaf node for a specific node The output of the service management module 214 is then sent to the calculation module 218. The calculation module 218 includes an item handler 312, an object handler 314 and a service score calculator 316. The item handler 312 receives input of item information 318 such as item ID number, name, attribute ID and attribute weight. The object handler 314 receives an input of object information 320, such as object ID, name, item ID, item weight, enable. The service score calculator 316 receives input of service information 322, such as service ID, name, object ID, item weight and enable. The calculation module 218 outputs a score card 324. The service score calculator 316 also receives an input of the fractional calculation formula and data structure.

The score card 324 preferably includes: a service ID 326 with a score, date and time; an object ID 328 with a score, date and time; and item ID 330 with a score, date and time; and an attribute ID 332 with a score, date and time. The score card 324 is outputted to the score management module 220.

Figure 5:
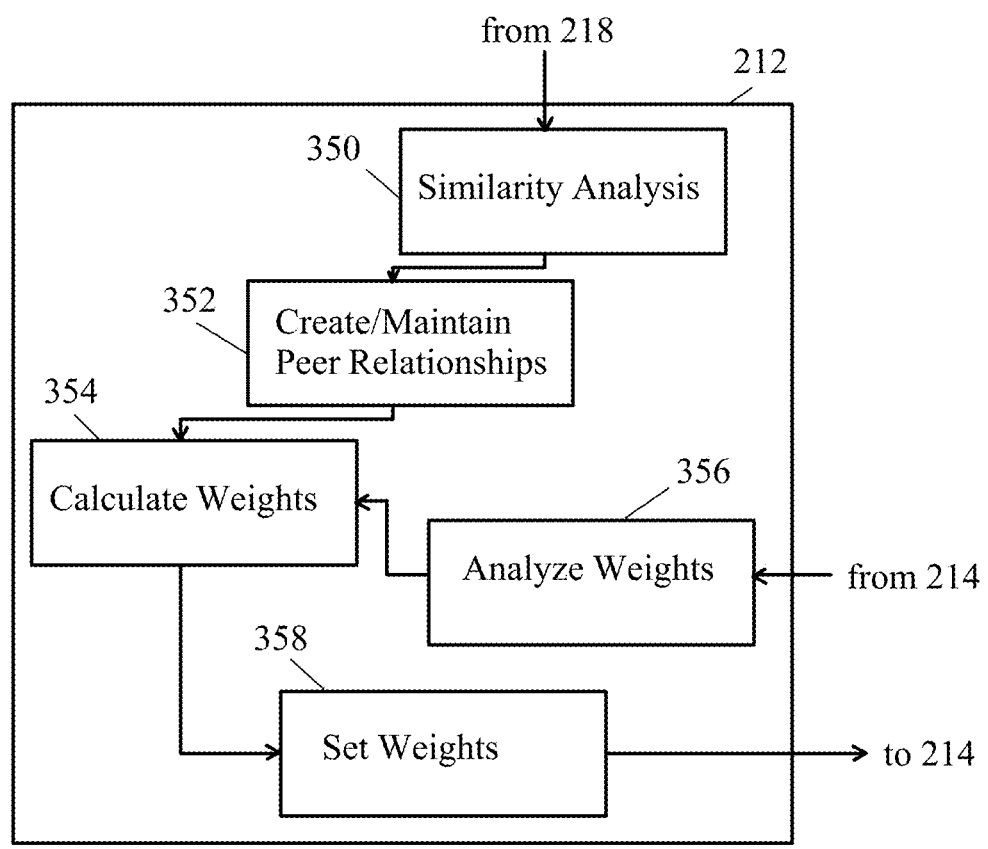
FIG. 5 shows a diagram of the self-learning optimization module.

FIG. 5 shows a diagram of the self-learning optimization module.

Within the self-learning optimization module 212, similarity analysis 350 occurs on peer objects or items by obtaining time series score of historic score data for all of the objects within one service or all items in one object and analyzing the similarity of the objects or items by calculation of the pair of objects or items with the highest similarity calculated using a correlation algorithm, for example Pearson correlation coefficient. An example of a time series score for objects is as follows:

TABLE 2

| Time | Host Server | VM | ... | Storage | Switch |
|---|---|---|---|---|---|
| 12:45 | 2 | 1 | ... | 1 | 1 |
| 12:30 | 4 | 1 | ... | 2 | 2 |
| ... | ... | ... | ... | ... | ... |

An example of a time series score for items is as follows:

TABLE 3

| Time | CPU | Memory | ... | Disk | Network |
|---|---|---|---|---|---|
| 12:45 | 2 | 2 | ... | 1 | 3 |
| 12:30 | 1 | 2 | ... | 1 | 4 |
| ... | ... | ... | ... | ... | ... |

Figure 6:
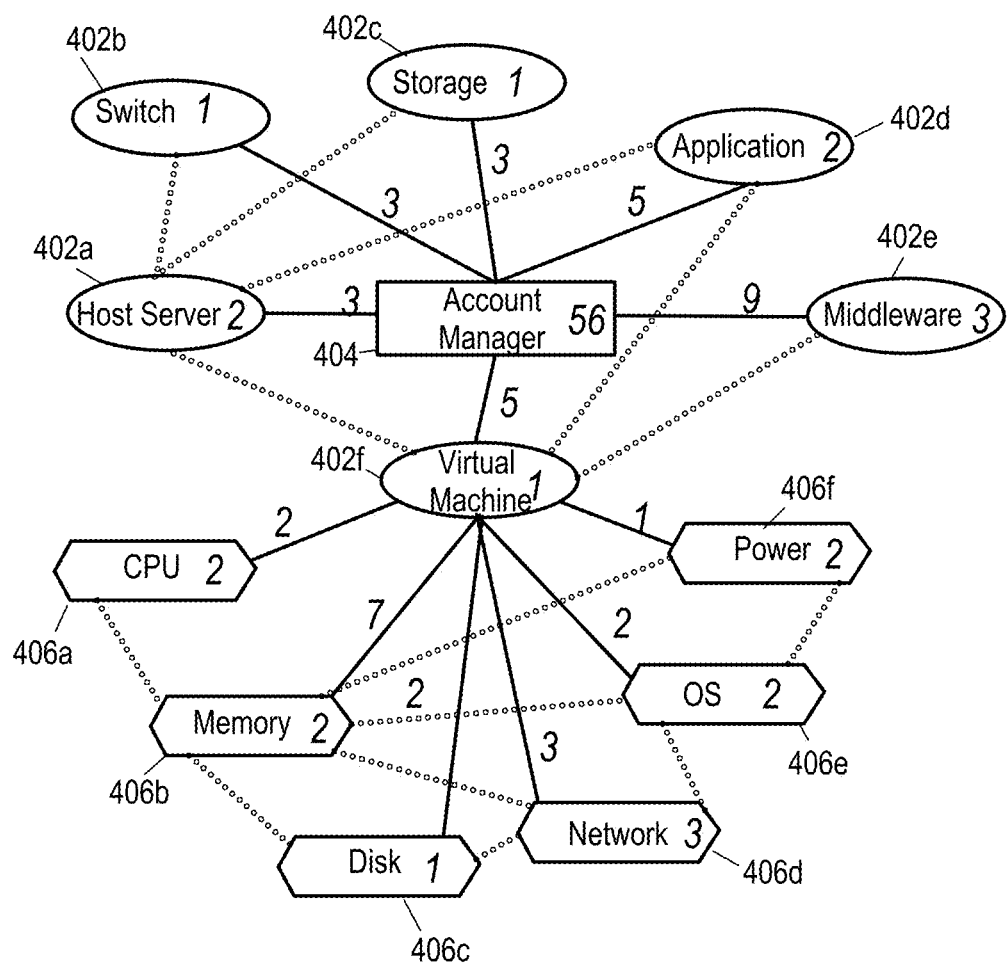
FIG. 6 shows an example of objects and item structure in one service.

After similarity analysis 350, maintenance and creation of peer relationships 352 occurs. The maintenance and creation of peer relationships 352 occurs by discovering relationships between items or objects and creating and maintaining said relationships. Referring to FIG. 6, if a line is not present between a pair of objects 402a-402f or items 406a-406f and the similarity analysis indicates that a relationship between the objects or between the items should be present, a relationship is created (line) between the objects or the between the items. If the similarity analysis indicates that relationship should no longer be present, the relationship would be removed (line removed) between objects or between items. For each object or item, comparing present relationship lines with the old relationship lines, if the relationship lines increase, the weight of the object or item is increased, whereas the weight of the object or item is reduced if the relationship lines decrease.

Next, the weight of the objects or items 354 is determined by obtaining the weight based on the relationship discovered by the similarity analysis and comparing the result with user feedback to optimize the algorithm received from the service management module 214 after the weight has been updated and analyzed by the feedback handling module 216. The weights are then optimized 358 and outputted to the service management module 214. Therefore, the analyze weights module 356 receives the user's feedback about the score for a specific service (from feedback handler 216), analyzes the relationship of nodes (in FIG. 6) to determine which weights need to be updated and then sends this data to the calculate weights module 354. The set weights module 358 sets the optimized weight from the calculate weights module 354.

FIG. 6 shows an example of objects and item structure in one service. The service and associated objects and item structure will vary from that shown.

Data used to calculate the relationship between objects and item in a service may be based the time series tables, for examples Tables 2 and 3.

The object and item structure includes a service of account manager 404 represented by a square. The account manager service 404 is related to a series of objects 402a-402f represented by ovals. Objects 402a-402f are related to other objects as indicated by the dotted lines. The objects 402a-402f are also related to items 406a-406f, represented by hexagons. Items 406a-406f are also related to other items. More specifically in this example, the account manager service 404 has objects of a host server 402a, a switch 402b, storage 402c, application 402d, middleware 402e, and virtual machine 402f. The host server 402a has a relation with the switch 402b, storage 402c, application 402d, and virtual machine 402f. The application 402d has a relation with the host server 402a and the virtual machine 402f. The middleware 402e has a relation with the virtual machine 402f.

The objects 402a-402f can each have relations with items 406a-406f as indicated by the dotted lines. In this example, the virtual machine object 402f has items of a CPU 406a, memory 406b, disk 406c, network 406d, OS 406e and power 406f. The CPU item 406a is related to the memory item 406b. The memory item 406b is related to the disk item 406c, network item 406d, OS item 406e and power item 406f. The disk item 406c is related to the network item 406d and the memory item 406b. The network item 406d is related to the OS item 406e and the memory item 406b. The OS item 406e is related to the power item 406f and the memory item 406b and the power item 406f is related to the memory item 406b and the OS item 406e.

Numbers present on the lines connecting the objects 402a-402f to the service 404 represent the weight of the object in a service. The larger the number, the more weight is associated with the object in the service. For example, the weight of the host server object 402a in the account manager service 404 is 3. The weight of the middleware object 402e in the account manager service 404 is 9. The weight of the application object 402d in the account manager service 404 is 5. The weight of the storage object 402c in the account manager service 404 is 3. The weight of the switch 402b object in the account manager service 404 is 3. The weight of the virtual machine object 402f in the account manager service 404 is 5.

The numbers within the objects 402a-402f represent the score of the object calculated from all of the items. For example, the host server object 402a has a score of 2, the switch object 402b has a score of 1, the storage object 402c has score of 1, the application object 402d has a score of 2, the middleware object 402e has a score of 3, the virtual machine object 402f has a score of 1.

Numbers present on the lines connecting the items 406a-406f to the object 402a-402f present the weight of the item in the object. The larger the number, the more weight is associated with the item in the object. In this example, the weight of the CPU item 406a in the object of the virtual machine object 402f is 2. The weight of the memory item 406b in the virtual machine object 402f is 7. The weight of the disk item 406c in the virtual machine object 402f is 2. The weight of the network item 406d in the virtual machine object 402f is 3. The weight of the OS item 406e in the virtual machine object 402f is 2. The weight of the power item 406f in the virtual machine object 402f is 1.

The number present within the service 404 represents the score of the service calculated from all of the objects. For example, the CPU item 406a has a score of 2, the memory item 406b has a score of 2, the disk item 406c has a score of 1, the network item 406d has a score of 3, the OS item 406e has a score of 2 and the power item 406f has a score of 2.

For each service 404, a score calculated from all of the objects 402a-402f is present within the service. In this example, the score associated with the account manager service 404 is 56. This score may be calculated within a time period set by an administrator, for example five minutes. A score predicting the trend for the next five minutes associated with a service is also preferably predicted. An example of multiple services with their associated score and predicted scores is shown in Table 4 below.

TABLE 4

| | Score | | | | |
|---|---|---|---|---|---|
| Time | Service 01 | Service 02 | ... | Service n | Service n + 1 |
| 2016 Nov. 15 15:45 | 56 | 67 | ... | 54 | 68 |
| 2016 Nov. 15 15:30 | 78 | 35 | ... | 43 | 45 |
| 2016 Nov. 15 15:15 | 34 | 43 | ... | 61 | 87 |
| 2016 Nov. 15 15:00 | 28 | 67 | ... | 36 | 48 |
| 2016 Nov. 15 14:45 | 54 | 89 | ... | 42 | 51 |
| ... | ... | ... | ... | ... | ... |
| 2016 Nov. 15 09:45 | 38 | 56 | ... | 76 | 35 |

Figure 8:
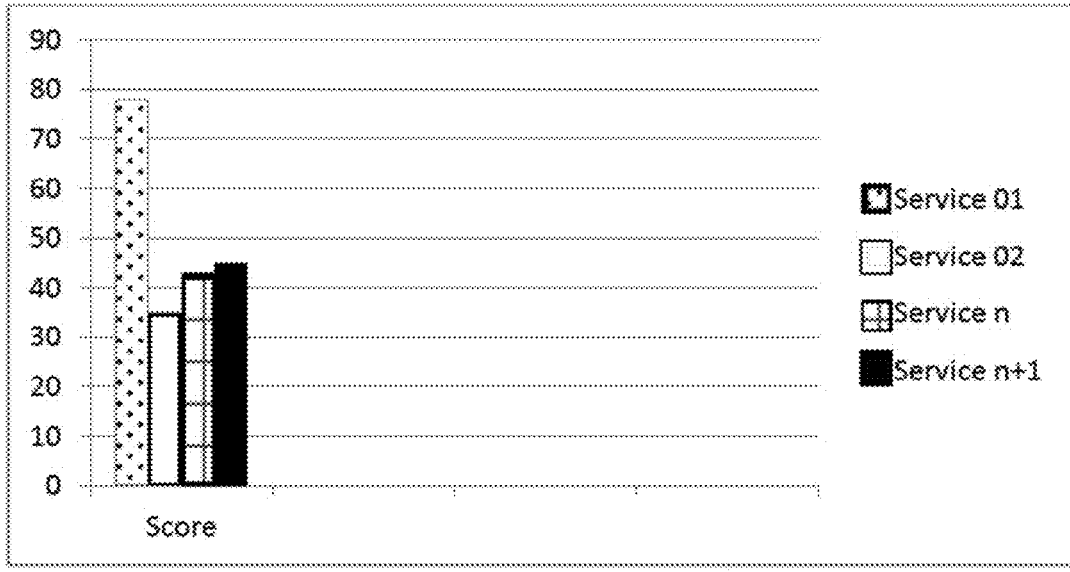
FIG. 8 shows an example of a histogram.

Due to the service score being the lowest for the time of 2016-11-15 at 15:30, a histogram as shown in FIG. 8 may be generated and the score highlighted for a user.

Figure 7:
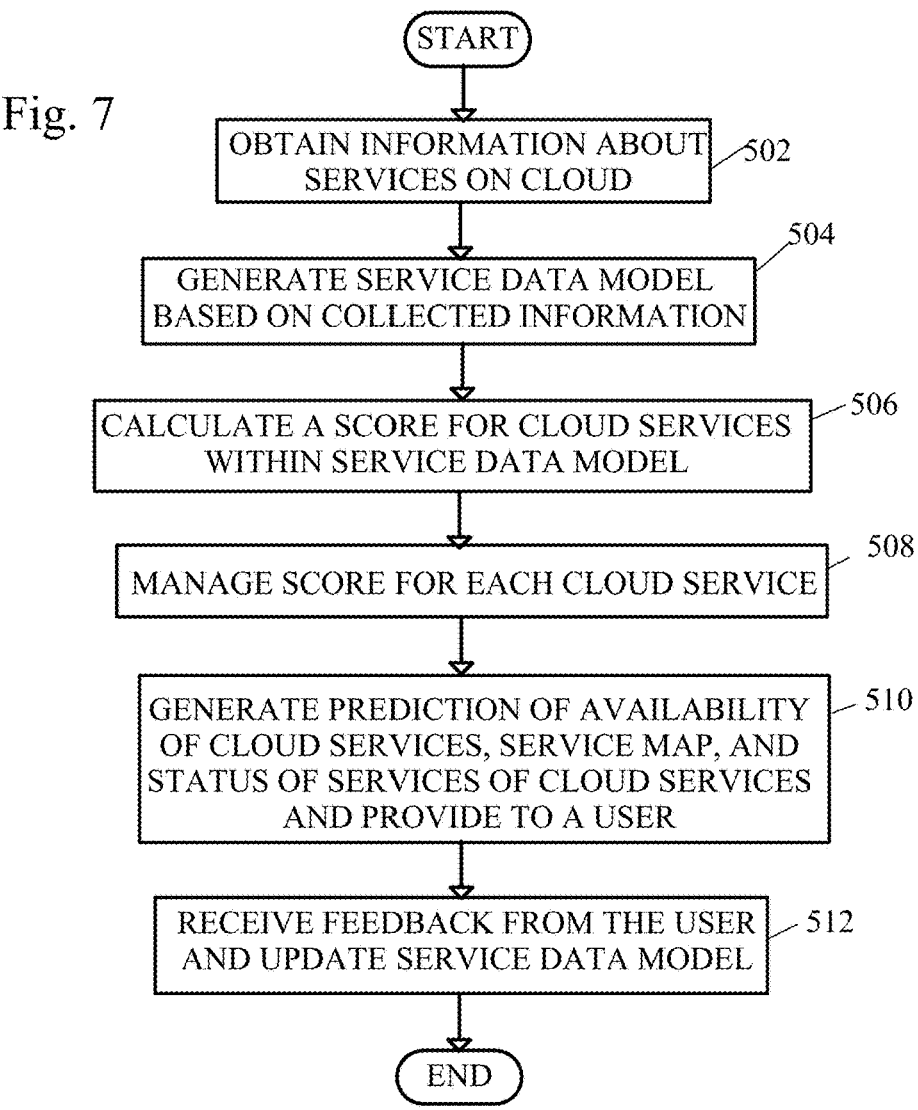
FIG. 7 shows a flowchart of a method of cognitively detecting service availability in a cloud environment.

FIG. 7 shows a flowchart of a method of cognitively detecting service availability in a cloud environment.

In a first step, the system obtains information about services on a cloud (step 502).

As described in FIG. 3, the cloud 200 is monitored 202 and the information is sent to an information manager 208, and a cloud configuration management database (CMDB) 206. The monitoring includes, but is not limited to servers, facilities, storage, network, hypervisors, virtual machines (VM), containers, topology, software and applications. A cloud manager 204 may manage the information manager 208. The information from the cloud CMDB 206 and the Information manager 208 is sent to a cognitive service 210. The information sent to the cognitive service 210 may include utilization of computer processing unit (CPU), memory and disk space; input output (JO) of a network and/or disk; logs of hardware run time, operating system (OS), database, middleware, cloud management platform, operation and maintenance; events based on predefined conditions; environment parameter configuration information of the OS, database, middleware, and cloud management platform.

The system generates as service data model based on collected information (step 504), preferably by the service management module 214. The service data model preferably includes at least the status of the services, a service object health map, and a service health status.

The system calculates a score for cloud services within the service data model (step 506). The score for each cloud service may be calculated using the calculation module 218.

The system generates prediction of availability of cloud service, service map, and status of services of cloud services, for example by the prediction module and provides the information to a user (step 510).

The system is receiving feedback from the user, for example by the self-learning and optimization module 212 and updates the service data model (step 512), for example by the feedback handler module 216 and the method ends.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of cognitively detecting the availability of a cloud service in a cloud computing environment, the cloud service comprising a plurality of attributes and at least one object including at least one item, the method comprising the steps of:
    obtaining information about the cloud service, the information comprising the attributes and usage of the cloud service;
    generating a cloud service data model based on the information, wherein the cloud service data model includes at least a status of the cloud services, a service object health map, and a service health status;
    calculating a score within the cloud service data model;
    generating a score card comprising the score, the at least one object and the plurality of attributes, wherein the score card comprises a service identification with the score, a date and a time, an object identification with the score, date and time, an item identification with the score, date and time, and an attribute identification with the score, date and time;
    generating a prediction of availability of the cloud service, the service object health map, and the status of the cloud services;
    providing the prediction of availability to a user;
    receiving feedback from the user; and
    updating the cloud service data model based on the feedback from the user.

2. The method of claim 1, further comprising providing the information to the user.

3. The method of claim 1, further comprising the steps of:
    comparing score data for objects within a peer service to score data of objects in the service to analyze similarity of the objects;
    comparing score data for items within the peer service to score data of items in the service to analyze similarity of items;
    discover relationships between items or objects in the service;
    creating a graph of the relationships discovered and relationships maintained between objects and between items within the service;
    obtaining weights of the relationships between items and between objects within the service; and
    adding weights to the graph.

4. The method of claim 3, further comprising the steps of optimizing the weights of the relationships between items and between objects within the service based on feedback received from the user.

5. The method of claim 3, wherein the relationships between objects and between items within a service are based on time series tables.

6. A computer system for cognitively detecting the availability of a cloud service in a cloud computing environment, the cloud service comprising a plurality of attributes and at least one object including at least one item, the computer system comprising a computer comprising at least one processor, one or more memories, one or more computer readable storage media having program instructions executable by the computer to perform the program instructions comprising:
    obtaining, by the computer, information about the cloud service, the information comprising the attributes and usage of the cloud service;

generating, by the computer, a cloud service data model based on the information, wherein the cloud service data model includes at least a status of the cloud services, a service object health map, and a service health status;

calculating, by the computer, a score within the cloud service data model;

generating, by the computer, a score card comprising the score, the at least one object and the plurality of attributes, wherein the score card comprises a service identification with the score, a date and a time, an object identification with the score, date and time, an item identification with the score, date and time, and an attribute identification with the score, date and time;

generating, by the computer, a prediction of availability of the cloud service, the service object health map, and the status of the cloud service;

providing, by the computer, the prediction of availability to a user;

receiving, by the computer, feedback from the user; and updating by the computer, the cloud service data model based on the feedback from the user.

7. The computer system of claim 6, further comprising providing the information to the user.

8. The computer system of claim 6, further comprising the program instructions of:

comparing score data for objects within a peer service to score data of objects in the service to analyze similarity of the objects;

comparing score data for items within the peer service to score data of items in the service to analyze similarity of items;

discover relationships between items or objects in the service;

creating a graph of the relationships discovered and relationships maintained between objects and between items within the service;

obtaining weights of the relationships between items and between objects within the service; and adding weights to the graph.

9. The computer system of claim 8, wherein the relationships between objects and between items within a service are based on time series tables.

10. A computer program product for cognitively detecting the availability of a cloud service in a cloud computing environment using a computer comprising at least one processor, one or more memories, one or more computer readable storage media, the cloud service comprising a plurality of attributes and at least one object including at least one item, the computer program product comprising a computer readable storage medium having program instructions embodied therewith, the program instructions executable by the computer to perform a method comprising:

obtaining, by the computer, information about the cloud service, the information comprising the attributes and usage of the cloud service;

generating, by the computer, a cloud service data model based on the information, wherein the cloud service data model includes at least a status of the cloud services, a service object health map, and a service health status;

calculating, by the computer, a score within the cloud service data model;

generating, by the computer, a score card comprising the score, the at least one object and the plurality of attributes, wherein the score card comprises a service identification with the score, a date and a time, an object identification with the score, date and time, an item identification with the score, date and time, and an attribute identification with the score, date and time;

generating, by the computer, a prediction of availability of the cloud service, the service object health map, and the status of the cloud services;

providing, by the computer, the prediction of availability to a user;

receiving, by the computer, feedback from the user; and updating by the computer, the cloud service data model based on the feedback from the user.

11. The computer program product of claim 10, further comprising providing the information to the user.

12. The computer program product of claim 10, further comprising the program instructions of:

comparing score data for objects within a peer service to score data of objects in the service to analyze similarity of the objects;

comparing score data for items within the peer service to score data of items in the service to analyze similarity of items;

discover relationships between items or objects in the service;

creating a graph of the relationships discovered and relationships maintained between objects and between items within the service;

obtaining weights of the relationships between items and between objects within the service; and adding weights to the graph.

13. The computer program product of claim 12, further comprising the program instructions of optimizing the weights of the relationships between items and between objects within the service based on feedback received from the user.

14. The computer program product of claim 12, wherein the relationships between objects and between items within a service are based on time series tables.

* * * * *